United States Patent [19]

Levin

[11] Patent Number: 5,890,066
[45] Date of Patent: Mar. 30, 1999

[54] CELLULAR NETWORK HAVING CELLS WHICH ARE IN A SPECIFIC CIRCULAR ORIENTATION OF SECTORS

[75] Inventor: Moshe Levin, Tel Aviv, Israel

[73] Assignees: Tadiran Telecommuniction Ltd.; Innowave Tadiran Telecommunictions Wireless Systems Ltd., both of Tikva, Israel

[21] Appl. No.: 561,133

[22] Filed: Nov. 20, 1995

[30] Foreign Application Priority Data

Nov. 21, 1994 [IL] Israel ......................................... 111722

[51] Int. Cl.$^6$ ........................................................ H04Q 7/04
[52] U.S. Cl. ................................................................. 455/446
[58] Field of Search ........................ 379/59, 60; 455/33.1, 455/33.2, 33.3, 33.4, 446, 447; 370/331

[56] References Cited

U.S. PATENT DOCUMENTS

| | | |
|---|---|---|
| 4,128,740 | 12/1978 | Graziano . |
| 4,144,411 | 3/1979 | Frenkiel ..................................... 379/59 |
| 4,369,520 | 1/1983 | Cerny, Jr. et al. ...................... 455/137 |
| 4,727,590 | 2/1988 | Kawano et al. . |
| 4,932,049 | 6/1990 | Lee ........................................... 379/60 |
| 5,038,399 | 8/1991 | Bruckart . |
| 5,073,971 | 12/1991 | Schaeffer . |
| 5,111,534 | 5/1992 | Benner . |
| 5,161,249 | 11/1992 | Meche et al. ........................... 455/33.3 |
| 5,164,958 | 11/1992 | Omura ..................................... 375/205 |
| 5,193,109 | 3/1993 | Lee ............................................. 379/60 |
| 5,212,830 | 5/1993 | Miller . |
| 5,365,571 | 11/1994 | Rha et al. . |
| 5,448,753 | 9/1995 | Ahl et al. ................................ 455/33.1 |
| 5,491,833 | 2/1996 | Hamabe .................................. 455/33.1 |
| 5,509,014 | 4/1996 | Utting ..................................... 370/95.3 |
| 5,551,060 | 8/1996 | Fujii et al. .............................. 455/33.4 |
| 5,612,701 | 3/1997 | Diekelman ............................. 342/354 |
| 5,613,199 | 3/1997 | Yahagi .................................... 455/33.1 |
| 5,633,915 | 5/1997 | Yang et al. ............................... 379/60 |
| 5,682,147 | 10/1997 | Eaton et al. ....................... 340/825.03 |

OTHER PUBLICATIONS

Wireless Week, "Vendors Fight Over Spread Spectrum"Jul. 15, 1996.

*Primary Examiner*—William Cumming
*Attorney, Agent, or Firm*—Darby & Darby

[57] ABSTRACT

An improved cellular communication network which is divided into a plurality of cells is provided. Each of the cells including a base station has at least two directional antennae, each of which is operative to communicate with a plurality of units. Each of the antennae is directed in a different direction and operates in a different frequency band. A characterisitic of the cellular network is that antennae, in adjacent cells, operating in similar frequency bands are directed in different directions.

11 Claims, 5 Drawing Sheets

CELLULAR NETWORK HAVING CELLS WHICH ARE IN A SPECIFIC CIRCULAR ORIENTATION OF SECTORS

FIELD OF THE INVENTION

The present invention relates generally to cellular communication networks and more particularly to cellular telecommunication networks.

BACKGROUND OF THE INVENTION

Cellular communication networks are well known in the art. An example of such a network is a cellular telephone network. Another example is the use of cellular communication in conventional telephone networks, i.e. for replacing physical (wire) connections between a central office and the subscribers units in dense urban areas where wiring is not practical or too costly.

Since a limited range of frequencies is allocated for each cellular telecommunication network, methods were developed to allow simultaneous use of frequency bands within the allocated range of frequencies. This enables an increased number of users per area to use the network at the same time.

One method for improving the use of an allocated range of frequencies includes reusing frequency bands within the allocated range of frequencies within the area covered by the network. This method which is known as the "cell method", is schematically shown in FIG. 1A to which reference is now made. The network of FIG. 1A covers an area indicated by reference numeral 12. The area 12 is divided into subareas, termed "cells", such as cell 14. Each cell includes a base station, such as base station 16, typically in its center. Each base station includes at least one non-directional antenna which communicates with any telephone or local station within the area covered by the cell.

Typically, two adjacent cells, such as cells 18 and 20 or cells 22 and 24, use different frequency bands within the range of frequencies allocated to the network. A typical width of a frequency band is on the order of 1 Mhz. In the network of FIG. 1, each cell operates in one of seven frequency bands within the range of frequencies allocated for the network. The bands are denoted F1, F2, F3, F4, F5, F6 and F7.

In a cellular network the reuse factor N, i.e. the number of distinct frequency bands required for covering the desired area, depends mainly on the capability of the antenna of a base station to cope with interference generated by the network users in other cells using the same frequency band. This capability is a function of the distance D between the interfering user unit and the signal carrier antenna. In a network, such as the network 10, which employs a reuse factor of 7, interference to an antennae in any cell, such as in cell 24, may come from any of the six closest cells which operate on the same frequency band, such as from users in cell 28.

The reuse factor also depends on the Carrier to Interference (C/I) ratio which measures the ratio between the carrier signal of an antennae and the interfering noise. For most modern networks, it is desired that the C/I ratio will be 7 dB–15 dB and preferably larger than 15 db to minimize interferences. Therefore, for a state of the art network which employs non-directional antennae, such as the network 10, a reuse factor of 7, as indicated by the notations F1–F7, is required in order to achieve a C/I ratio of 18.6 dB which meets the desired C/I value of 15 dB.

One way to reduce the reuse factor, in order to use a smaller range of frequencies, is to employ directional antennae in each one of the cells instead of the non-directional antennae of the network 10. A typical prior art cellular network which employs directional antennae is shown in FIG. 1B to which reference is now made.

In the network of FIG. 1B, referenced generally 50, three directional antennae are employed in each cell. Each antenna is directed to a different direction and is using a different frequency band of the three frequency bands denoted F1, F2 and F3.

In prior art networks which employ directional antennae in adjacent as well as in distant cells, antennae which are directed to the same direction employ a similar frequency band. For example, in the network 50, the antennae 52, 56 and 60 which employ the F2 band are directed in the same direction and cover the same area of the cells, 54, 58 and 62, respectively, i.e. the areas in the upper right side of each cell denoted 64, 66 and 68, respectively.

In the network 50, an improved C/I ratio relative to a similar network which employs non-directional antennae is achieved since interferences come to any antennae from two adjacent cells and not from six cells as in the network 10 as described in more detail with reference to FIG. 1C.

Reference is now made to FIG. 1C which is a schematic illustration of part of the network 50 in an operation mode. For clarity of presentation only, four cells in FIG. 3, cells 54, 58, 62 and 90 are shown in detail whereas the other cells are outlined only.

For each of the cells 54, 58, 62 and 90, there is shown a unit which communicates with one of the directional antennae in each cell, the antennae which employs the F3 frequency band. In the cell 54, unit 84 communicates with the antenna which covers the area 164, in the cell 58, unit 82 communicates with the antenna covering the area 66, in the cell 62, unit 86 communicates with the antenna covering the area 68 and in the cell 90 and unit 96 communicates with the antenna covering the area 92.

A characteristic of prior art networks, such as the network 50 is that interferences to any antennae come from two adjacent cell and also from more distant cells. For example, interferences to the antenna which employs the F3 frequency band in the cell 54 come from the units 82 and 86 of the cells 58 and 62, respectively, and to much less extent from the unit 90 of the cell 92. This is because all the antennae of the cells 53, 58, 62 and 92 which employ the F3 frequency band are directed in the same general direction as indicated by arrows 74, 82, 86 and 94, respectively.

For the network 50 the C/I ratio with comparable technology to that of the network 10 is 19.1 dB. For a network like network 50, with a reuse factor of 7, i.e. which employs altogether 21 frequency bands, three per each cell and with a reuse factor of 7, the C/I ratio is 23.4 dB.

SUMMARY OF THE INVENTION

It is an object of the present invention to provide an improved cellular communication network which employs directional antennae.

The present inventor has realized that if, in at least two adjacent cells, the direction of antennae which operate in a similar frequency band will be different and not similar as in prior art networks which employ directional antennae, the C/I ratio of the network can be improved as well as the number of users per unit area.

There is thus provided, in accordance with a preferred embodiment of the present invention, an improved cellular communication network divided into a plurality of cells, each one of the cells including a base station comprising at least two directional antennae, each of which is operative to communicate with a plurality of units, each of the at least two antennae is directed in a different direction and operating in a different frequency band, the network being characterized in that in any adjacent cells of the plurality of cells, antennae which operate in a similar frequency band are directed in a different direction.

There is also provided, in accordance with a preferred embodiment of the present invention, a method for cellular communication comprising the steps of dividing a cellular communication network into a plurality of cells, each one of the cells including a base station comprising at least two directional antennae operating in a different frequency band, each of which is operative to communicate with a plurality of units, directing each of the at least two antennae in a different direction and operating in a different frequency band such that in any adjacent cells of the plurality of cells antennae which operate in a similar frequency band are directed in a different direction. Preferably, the area covered by the cell is covered by the at least two directional antennae.

Further, according to a preferred embodiment of the present invention, the area covered by the at least two directional antennae is generally similar to the area covered by the cell.

Additionally, according to a preferred embodiment of the present invention, each one of the plurality of units may include a directional antennae directed generally in the direction of at least one directional antennae with which it communicates. Further, its angle of operation may be substantially smaller than the angle of operation of the directional antenna with which it communicates.

Preferably, at least two antennae of each of the base stations may generally cover the range of frequencies allocated for the cellular communication network.

Still further, according to a preferred embodiment of the present invention, at least one of the plurality of units may be a stationary unit and the network may be a telephone communication network.

Additionally, according to a preferred embodiment of the present invention, the operation of the at least two antennae in the plurality of cells may be synchronized.

Finally, according to a preferred embodiment of the present invention, interferences to each antenna come from a single cell which is not adjacent to the cell of the antenna being interfered.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1A:
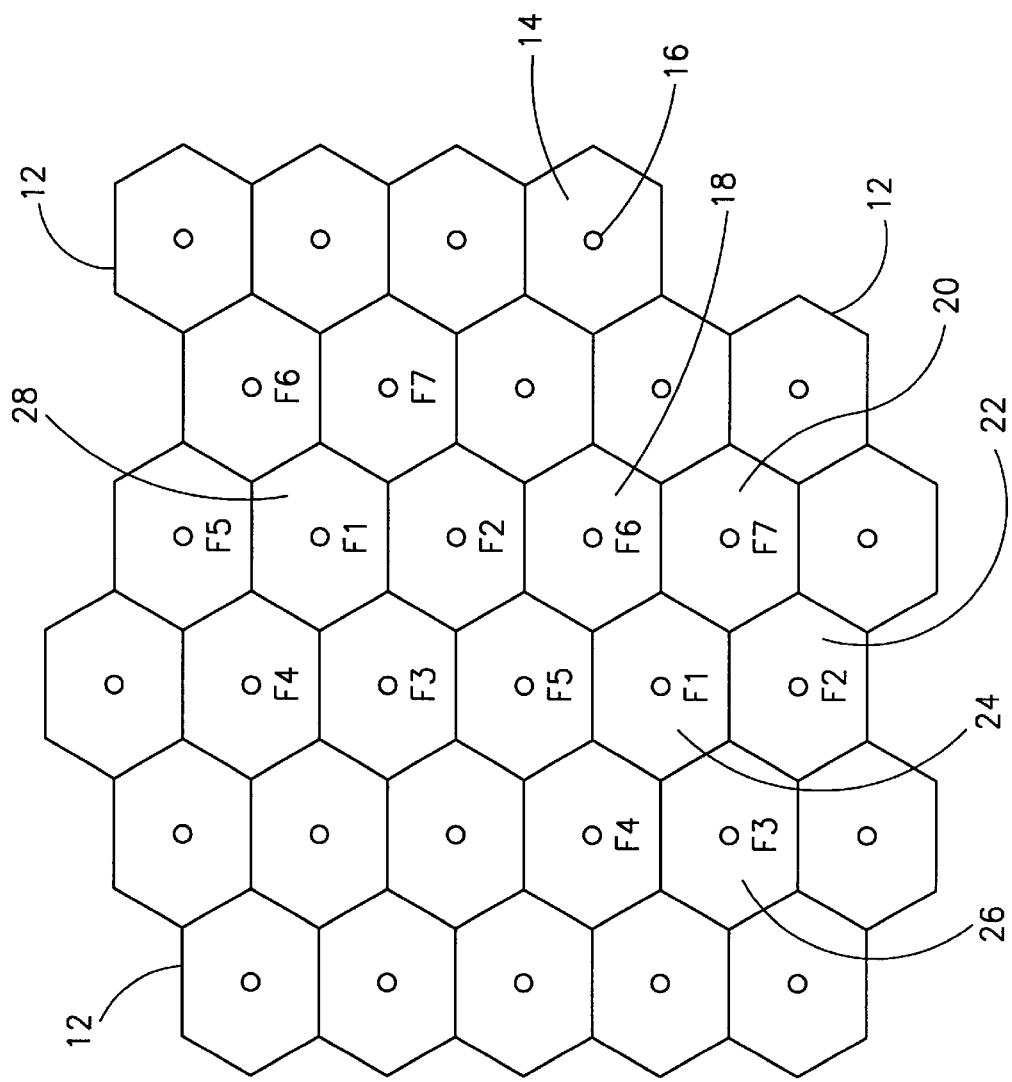
FIG. 1A is a schematic illustration of a prior art cellular telecommunication network which employs the cell method.
Figure 1B:
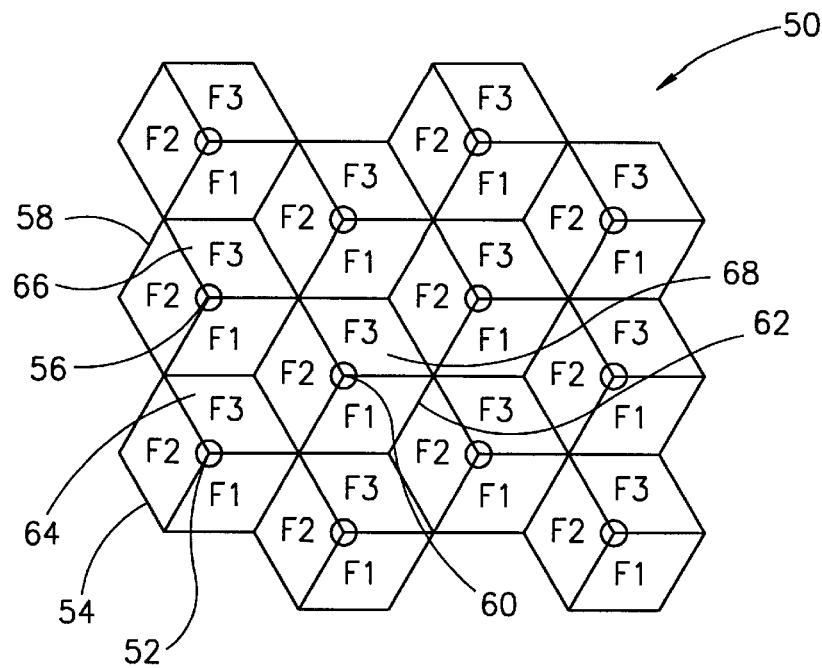
FIG. 1B is a schematic illustration of a prior art cellular communication which employs the cell method with directional antennae in each cell.
Figure 2:
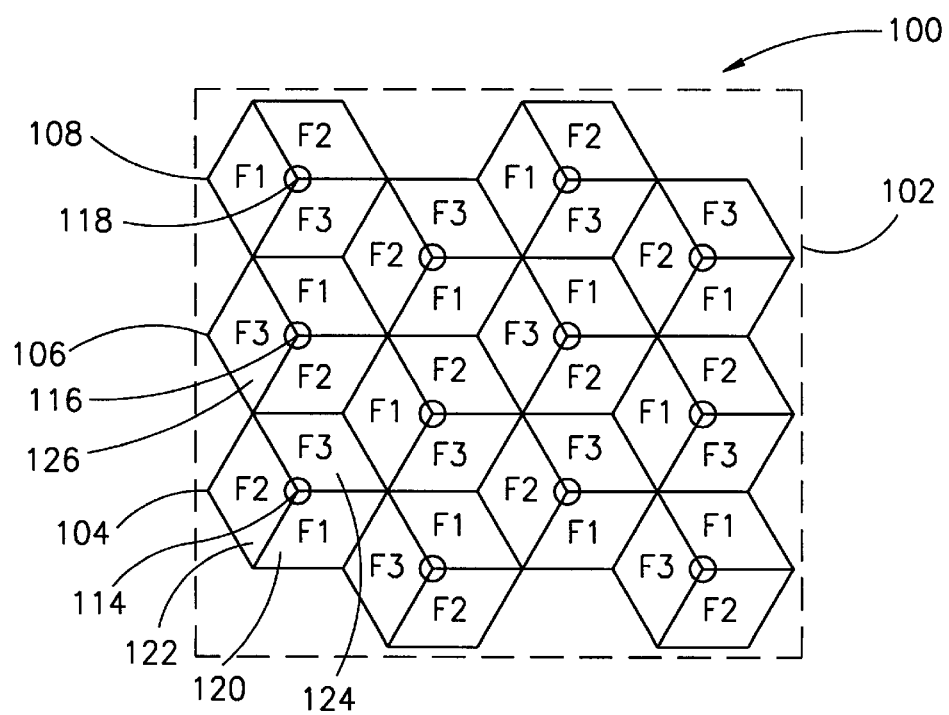
FIG. 2 is a schematic illustration of a cellular network, constructed and operative in accordance with a preferred embodiment of the present invention.
Figure 1C:
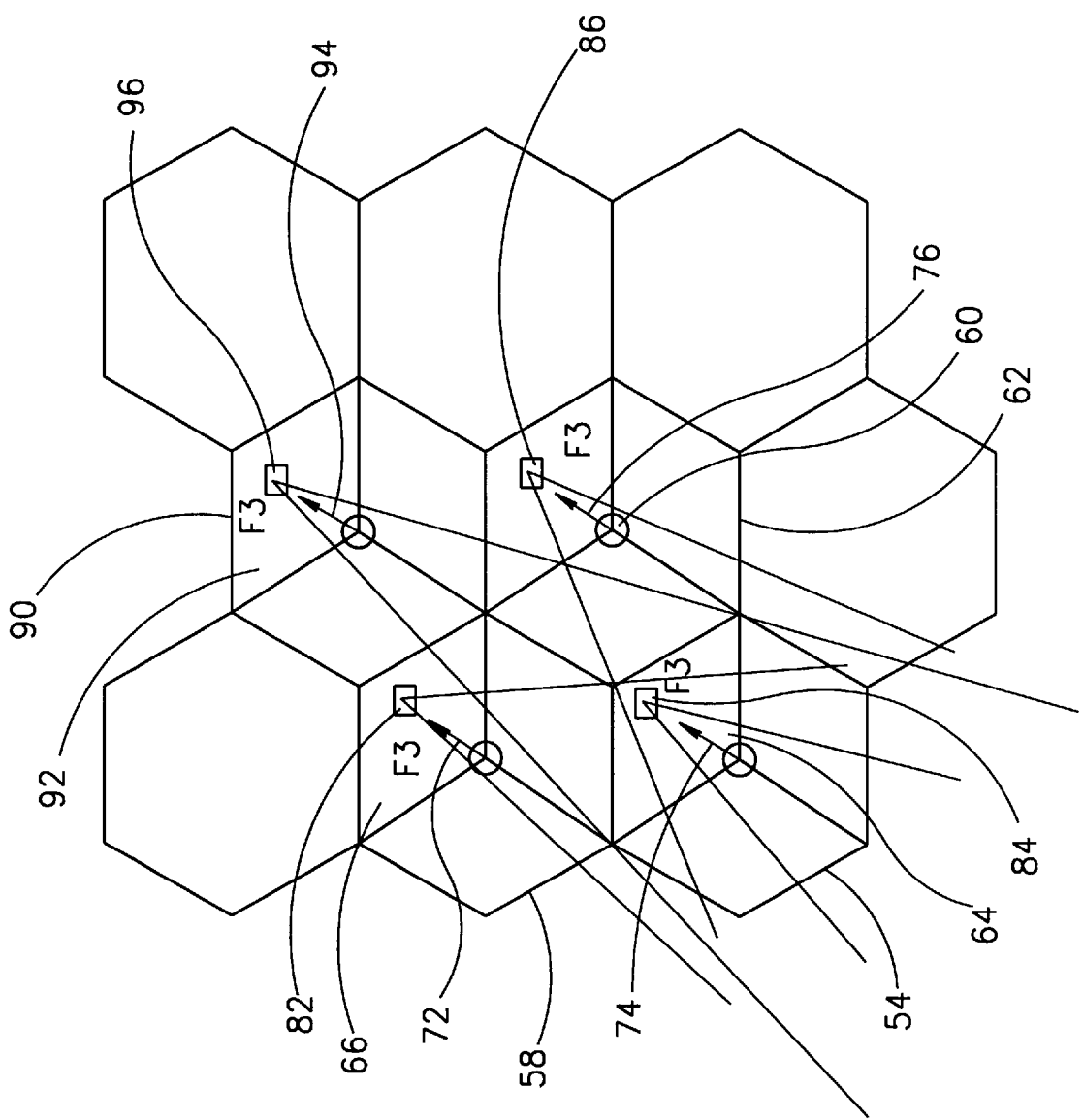
FIG. 1C is a schematic illustration of the prior art network of FIG. 1B in an operation mode.

Reference is now made to FIG. 2 which is a schematic illustration of a cellular communication network constructed and operative according to a preferred embodiment of the present invention. The network of FIG. 2, generally referenced 100, covers an area which is schematically indicated by the dashed line 102. The network 100 preferably comprises a plurality of cells, such as cells 104, 106 and 108. It will be appreciated that the network 100 is not limited to any particular number of cells. For exemplary purposes only, twelve cells are shown for the network 100.

The network 100 may be any suitable communication network, such as a Time Division Multiple Access (TDMA) network, in which all the base stations are synchronized in order to minimize interferences therebetween.

Each one of the cells of the network 100 preferably include a base station, preferably at its center, as indicated by reference numerals 114, 116 and 118, for the cells 104, 106 and 108, respectively. Each one of the base stations, 114, 116 and 118, includes three antenna, each of which is directed in a different direction. As shown for the base station 114, three antennae (better illustrated in FIG. 4 to which reference is briefly made) are directed in three different directions such that each antenna covers an angle of operation of 120°. The areas covered by the operation of each antennae are referenced 120, 122 and 124, respectively.

The antennae of the base stations, such as the three antennae of the base station 114, preferably operate in three different frequency bands within the band allocated for the network. The three antennae of the base station 114 employ the frequency bands F1, F2 and F3 indicated on the respective areas 120, 122 and 124.

It will be appreciated that while the base station 114 includes three directional antennae, the angle of operation of each of which covering an angle of 120°, any number of antennae may be employed in the network 100 provided that together they cover the area of the cell, i.e. they provide a coverage of 360°.

It is a particular feature of the network 100, that for at least two adjacent cells, the directions of the antennae which operate with a similar frequency band is different, and therefore, in contrast to prior art networks, such as network 50, the areas covered thereby are in different orientations. For example, the area 120 covered by the antennae of the cell 104 which employ the F3 frequency band, is above the base station 114 while the area 126 covered by the antennae which employ the F3 frequency band in the cell 106 is on the left of the base station 116.

It will be appreciated that while the direction of the antennae which employ the same frequency band in two adjacent cells is different, the antennae of cells which are distanced one from the other may be directed to the same direction.

Figure 3:
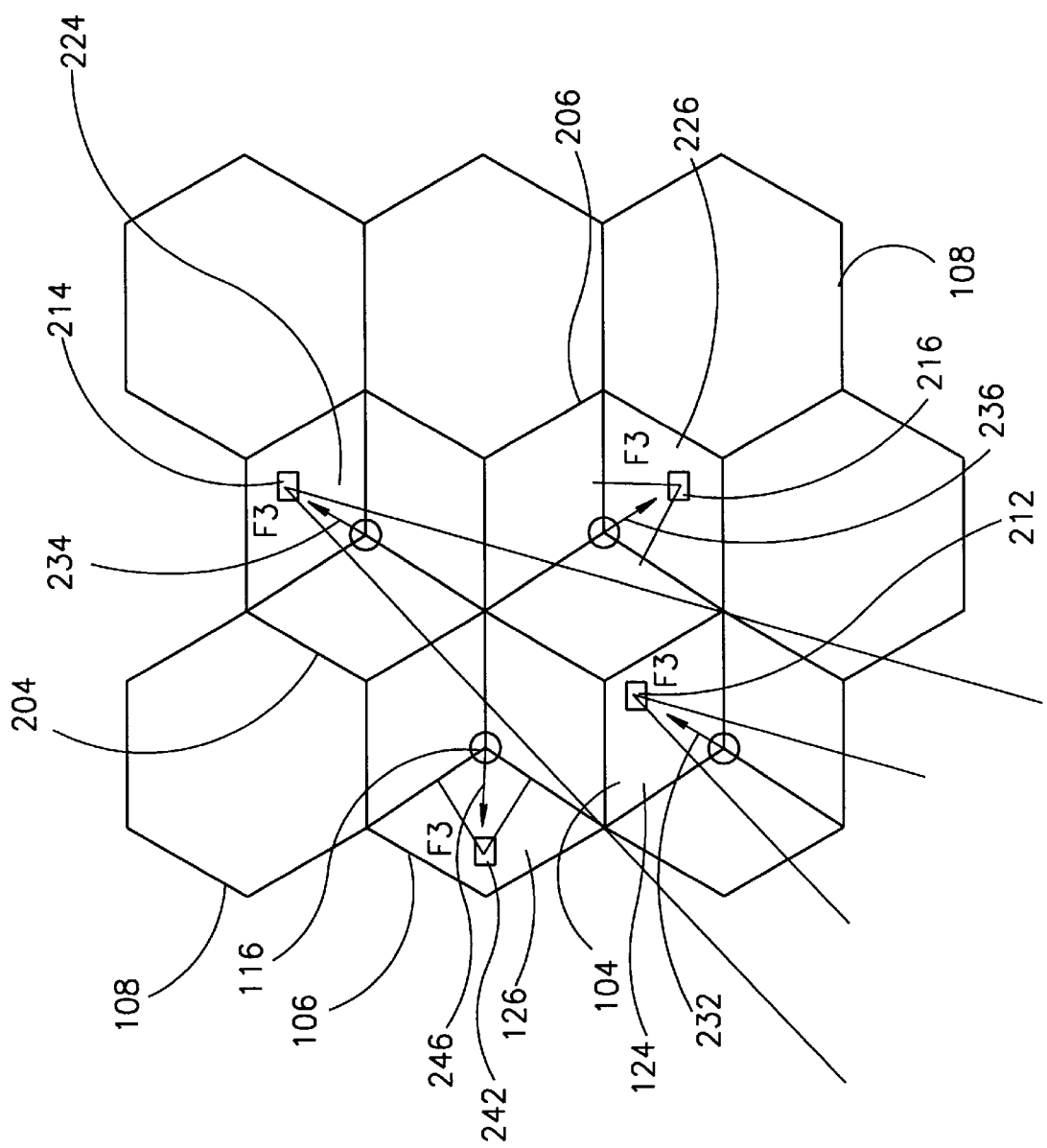
FIG. 3 is a schematic illustration of the network of FIG. 2 in an operation mode.

Reference is now made to FIG. 3 which is a schematic illustration of part of the network 100 in an operation mode. For clarity of presentation only, three cells in FIG. 3, cells 104, 204 and 206 are shown in detail whereas the other cells, such as the cells 106 and 108, are outlined only.

For each of the cells 104, 204 and 206, there is shown a unit which communicates with one of the directional antennae in each cell, the antennae which employs the F3 frequency band. In the cell 104, unit 212 communicates with the antenna which covers the area 124, in the cell 204, unit 214 communicates with the antenna covering the area 224 and in the cell 206, unit 216 communicates with the antenna covering the area by the arrow 226.

It will be appreciated that one unit which communicates with each antennae is shown here for exemplary purposes only, and that typically, each antennae communicates with a plurality of units within the area which it covers.

It is a particular feature of the present invention that interferences to any antennae come only from one cell which is not adjacent to the cell of the antenna being interfered. For example, interferences to the antenna which employs the F3 frequency band in the cell 104 and which is directed in the general direction indicated by the arrow 232 is interfered only from units directed to the antennae which is directed in the general direction of arrow 236.

It is a particular feature of the present invention that the frequency band reuse scheme avoids interference between users which communicate with antennae which employ the same frequency band in two adjacent cells. For example, the unit 216 of the cell 206 and the unit 242 of the cell 246 are directed towards their respective antennae (the antennae directed in the directions 236 and 246, respectively) do not interfere with the antenna of the cells 104 and 204 which employ the F3 frequency band.

It will be appreciated that by employing the antennae direction scheme of the present invention, a significant improvement in the C/I ratio is achieved. For example, by employing the direction scheme of the network 100, a C/I ratio of 28.6 dB is obtained in comparison with the value of 16.1 dB for the prior art network 50, without any other modification in the network.

It will be appreciated that the network 100 may alternatively use, for example, the range of frequencies allocated to the prior art network 10 more effectively. By using 21 frequency bands, each three of which are equivalent in their band width to each one of the frequency bands F1–F7 of the prior art network 10, more users can be connected to network per unit area.

Figure 4:
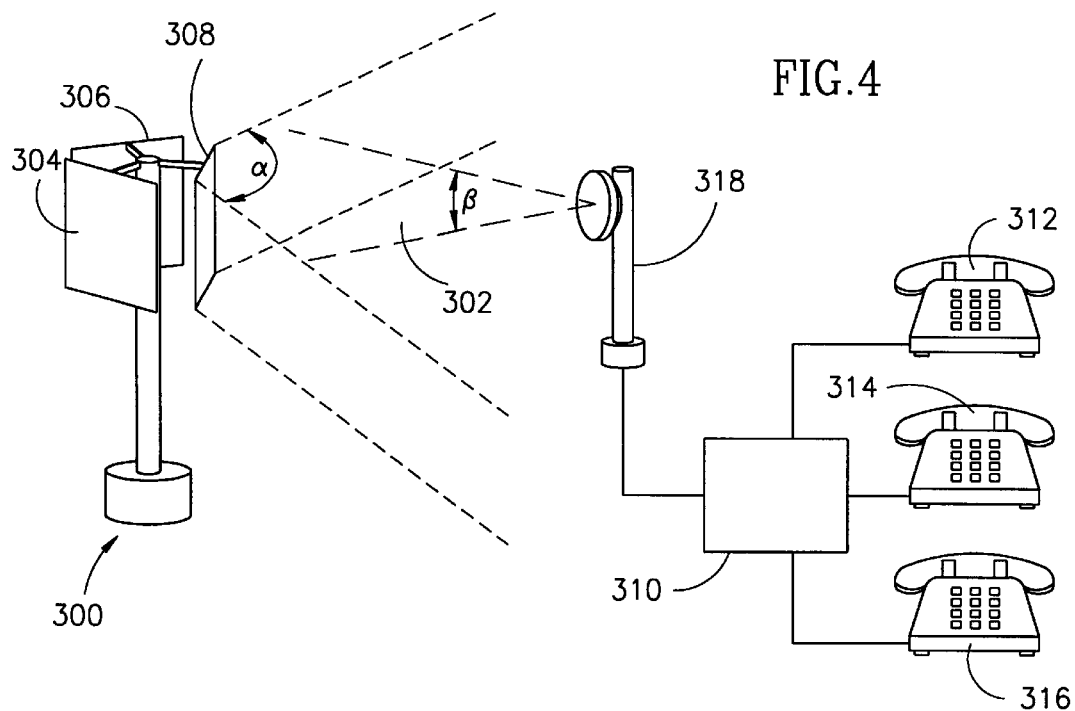
FIG. 4 is a partially isometric, partially schematic illustration of one cell of a cellular network, according to a preferred embodiment of the present invention.

Reference is now made to FIG. 4 which is a partially isometric, partially schematic illustration of one cell of a cellular network 100 according to a preferred embodiment of the present invention. The embodiment of FIG. 4 illustrates a conventional telephone network in which cellular communication replaces wiring between a base station and a local station.

The cell, generally referenced 300, preferably includes a base station 302 and three antennae 304, 306 and 308, each of which covers 120° of the cell as indicated by the angle α. The cell 300 preferably also includes a plurality of local stations, of which only one, station 310 is shown. Each station is connected to a plurality of local ports, such as the telephone set 312, 314 and 316, typically via wires.

Each one of the local units 310 includes a directional antenna which communicates with the antenna it generally faces. In FIG. 3 the antenna 318 of the local unit 310 communicates with the antenna 308.

It will be appreciated that the angle of operation of the antenna 318 is smaller than 120° to minimize interference with other antennae. Typically, the angle of operation of the antenna 318 may be 30°–60° as indicated by the angle β. By using directional antennae for the local antennae, such as antenna 318, their distance of operation increases, and therefore larger cells may be used.

Figure 5:
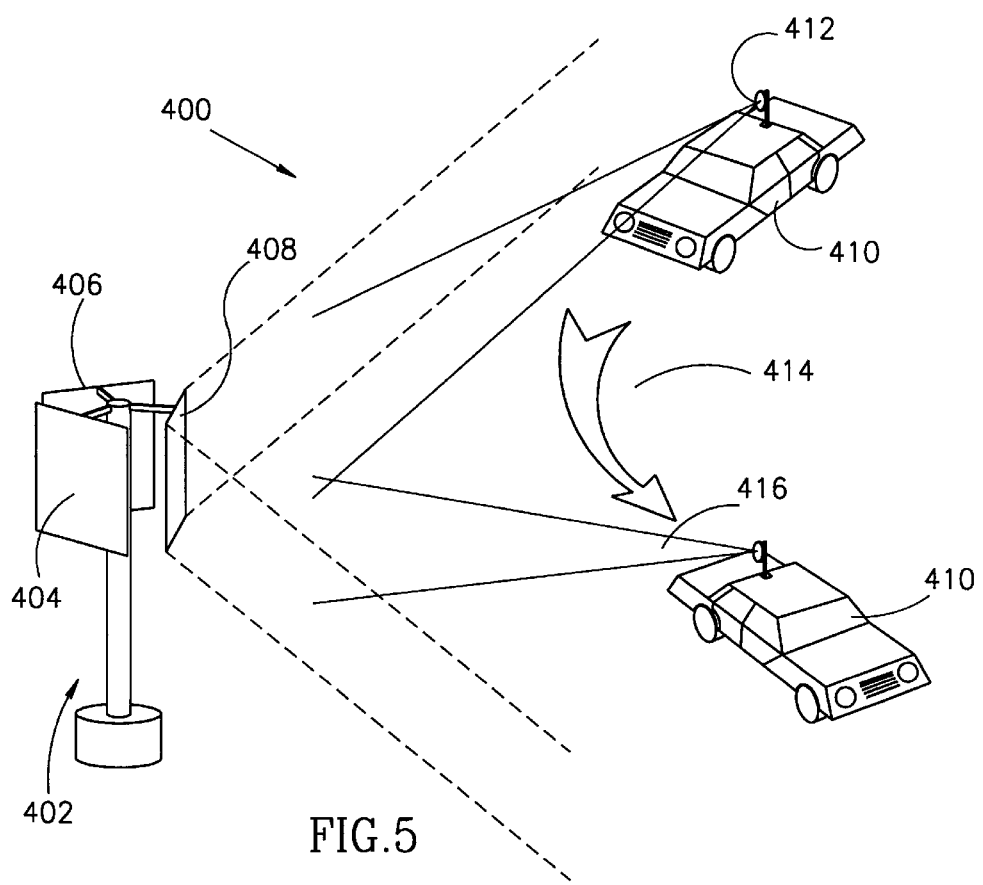
FIG. 5 is a partially isometric, partially schematic illustration of one cell of a cellular network, according to a second preferred embodiment of the present invention.

Reference is now made to FIG. 5 which is a partially isometric, partially schematic illustration of one cell of a cellular network according to a second preferred embodiment of the present invention. The embodiment of FIG. 5 illustrates only one cell of a cellular telephone network, operating with a single vehicle in two locations.

The cell, generally referenced 400, preferably includes a base station 402 which includes three directional antennae, 404, 406 and 408, and a multiplicity of non-stationary telephones. The operation of only one, the telephone mounted in the vehicle 410 and having an antenna 412, is discussed in detail.

It is a particular feature of the present invention that the antenna 412 is fixed to any suitable mechanism, such as a gyroscopic mechanism, which enables the antenna 412 to rotate in all directions, thereby enabling it to stay directed towards the antenna 408 of the base station 402 independent of the vehicle orientation. As illustrated schematically in FIG. 4, when the vehicle 410 changes its orientation as indicated by arrow 414, the orientation of the antenna changes as indicated by reference numeral 416, such that it stays directed towards the antenna 408.

It will be appreciated that the preferred embodiments described hereinabove are described by way of example only and that numerous modifications thereto, all of which fall within the scope of the present invention, exist. A non-limiting example is to use six directional antennae in each of the base stations of the network 100. Alternatively, any desired reuse factor with any suitable range of frequencies allocated for the network may be employed.

It will also be appreciated that the present invention is not limited to telecommunication networks. Rather, any of the embodiments described hereinabove and any modification thereof may utilize any type of communication network which employs cellular communication.

It will be appreciated by persons skilled in the art that the present invention is not limited by what has been particularly shown and described herein above. Rather the scope of the invention is defined by the claims which follow:

I claim:

1. A communication network divided geographically into a plurality of cells, each cell having a base station located substantially at its center, each base station comprising at least three directional antennae, each directional antenna operating in at least one corresponding radial sector of its cell for communicating with at least one unit, said unit including a directional antenna, said network having a plurality of spatially allocated transmission frequencies, wherein:

all of said frequencies are divided into groups, all of said groups being available in each cell, each of said groups corresponding to at least one of said frequencies;

each sector being assigned with at least one of said frequency groups, wherein each of said sectors including said at least one frequency group are allocated in the same circular order in all cells; and each cell having a specific circular orientation of said sectors, said specific circular orientation being fixed relative to said network such that in at least two adjacent cells of said network, said antennae of said base stations that operate in a similar frequency group are directed in different directions.

2. A communication network according to claim 1, wherein said network is a cellular network.

3. A communication network according to claim 1, wherein said network is a telecommunication network.

4. A communication network according to claim 1, wherein said network is a cellular telecommunication network.

5. A method for allocating frequencies in a geographically distributed communication network covering an area, comprising the steps of:

dividing said area into a plurality of cells, each cell having a base station located substantially at its center, each base station comprising at least three directional antennae, each directional antenna operating in at least one corresponding radial sector of its cell for communicating with at least one unit, said unit including a directional antenna, said network having a plurality of spatially allocated transmission frequencies, dividing all of said frequencies into groups, all of said groups being available in each cell, each of said groups corresponding to at least one of said frequencies;

assigning each one of said sectors with at least one of said frequency groups, wherein each of said sectors including said at least one frequency are allocated in the same circular order in all cells; and providing for each cell, a specific circular orientation of said sectors that is fixed relative to said network, such that in at least two adjacent cells of said network, said antennae of said base stations that operate in a similar frequency group are directed in different directions.

6. A method according to claim 5, wherein said network is a cellular communication network.

7. A method according to claim 5, wherein said network is a telecommunication network.

8. A method according to claim 5, wherein said network is a cellular communication network.

9. The communication network of claim 1, wherein each of said at least one radial sectors corresponding to each directional antenna is a different radial sector of said cell.

10. The communication network according to claim 9, wherein said different radial sectors are non-overlapping.

11. The communication network of claim 10, wherein said at least two adjacent cells includes two or more cells so as to form said communication network.

* * * * *